United States Patent [19]

Yabuki

[11] Patent Number: 5,724,244
[45] Date of Patent: Mar. 3, 1998

[54] MICROWAVE OVEN AND A CASH REGISTER SYSTEM INCLUDING THE SAME

[75] Inventor: Tsutomu Yabuki, Kawasaki, Japan

[73] Assignee: Fujitsu Limited, Kawasaki, Japan

[21] Appl. No.: 635,873

[22] Filed: Apr. 18, 1996

[30] Foreign Application Priority Data

Apr. 20, 1995 [JP] Japan ................. 7-094821

[51] Int. Cl.[6] .................. H05B 6/68; H05B 6/64; G06K 7/10
[52] U.S. Cl. .................. 364/464.1; 99/325; 219/489; 219/679; 219/702; 250/271; 364/400; 395/216; 395/223
[58] Field of Search .................. 99/325; 219/489, 219/679, 702; 235/454, 462, 470; 250/271, 566, 568; 364/400, 464.01, 464.1; 395/216, 220, 223; 426/234, 243

[56] References Cited

U.S. PATENT DOCUMENTS

| | | | |
|---|---|---|---|
| 4,323,773 | 4/1982 | Carpenter | 235/473 |
| 4,816,635 | 3/1989 | Edamura | 219/714 |
| 4,924,048 | 5/1990 | Bunce et al. | 219/734 |
| 4,945,216 | 7/1990 | Tanabe et al. | 235/462 |
| 5,214,410 | 5/1993 | Verster | 340/572 |
| 5,321,232 | 6/1994 | Ogle | 219/506 |
| 5,504,311 | 4/1996 | DuBuis et al. | 219/714 |

FOREIGN PATENT DOCUMENTS

| | | |
|---|---|---|
| 0 550 124 | 7/1993 | European Pat. Off. . |
| 0 577 534 | 1/1994 | European Pat. Off. . |
| 0 626 798 | 11/1994 | European Pat. Off. . |
| 2 217 558 | 10/1989 | United Kingdom . |
| 92/16083 | 9/1992 | WIPO . |

*Primary Examiner*—Edward R. Cosimano
*Attorney, Agent, or Firm*—Staas & Halsey

[57] ABSTRACT

A microwave oven and a cash register system of a store in which an employee of a store, who is requested to operate the microwave oven, can run the store efficiently while reducing the waiting time for shoppers and suppressing losses deriving from incorrect operation of the microwave oven. The microwave oven includes an irradiator for irradiating microwaves to heat articles, an article information reader for reading article information from an article information recording medium arranged on the surface of the article, and a heating control unit for controlling the irradiator to operate at a condition determined based on the article information read by the article information reader.

22 Claims, 14 Drawing Sheets

MICROWAVE OVEN AND A CASH REGISTER SYSTEM INCLUDING THE SAME

BACKGROUND OF THE INVENTION

1. Field of the Invention

The present invention relates to a microwave oven widely used in distribution industries including convenience stores. More particularly, this invention is concerned with a cash register system in a store in which such microwave ovens and a cash register operating as a POS terminal are combined.

2. Description of the Related Art

An existing microwave oven that is widely used for heating box lunches, made dishes, or the like in the distribution industries is normally utilized as follows: a shopper presents all required articles to be purchased to an employee in a store.

The employee recognizes an article, which may need to be heated by a microwave oven, among the wanted articles, and asks the shopper if he/she wants the article to be heated by the microwave oven.

When the shopper replies that he/she wants the article to be heated, the employee loads the article in a heating chamber of the microwave oven in the store, sets heating conditions including a heating time by manipulating setting buttons or the like, and then presses a heating start button so as to start the heating.

Thereafter, the total of the prices for the heated article and the other articles is calculated by a cash register. Thus, a payment by the shopper is completed. The cash registers used in the convenience stores usually operate as POS terminals. Therefore, in the descriptions as set below, POS terminals are used as the cash registers.

On the other hand, the heated article has been handed to the shopper by the employee. That is to say, the POS terminal and microwave oven are not coupled with each other but used independently.

In a store carrying diverse heatable articles, heating conditions differ from article to article. An employee checks the information on heating conditions, which is printed on each article or complied in the form of a list by the store, and sets a time and an output level at a keyboard of a microwave oven every time. This procedure is indispensable.

Moreover, when many shoppers are queuing at a cashier, if there are articles that are requested to be heated and articles that are not requested to be heated, the heating time required for the articles requested to be heated becomes a waiting time for the shoppers.

The length of the processing time greatly affects the sales performance of the store.

Furthermore, at stores in the distribution industries, employees familiar with the operation of equipment including a microwave oven are not always available. It is not rare that novices such as part-time workers must operate the equipment.

In such a case, if a system requires a complex operation, a wait time of shoppers extends to affect the running of a store.

There is therefore a demand for a more efficient and simpler operating method.

SUMMARY OF THE INVENTION

An object of the present invention is to provide a microwave oven and a cash register system for a store enabling an employee of a store, who is requested to operate a microwave oven, to run the store efficiently while reducing the wait time for shoppers and suppressing losses deriving from incorrect operation of the microwave oven.

A microwave oven according to the present invention has the ability to heat an article purchased by a shopper. Further, the microwave oven uses an article information reader to read the article information, and sets heating conditions on the basis of the article information.

The article information reader reads the article information of the article under the control of the microwave oven. The article is required by a shopper, and bears the article information on the surface thereof.

The article information is attached to the surface of the article, and recognized by the article information reader. The contents of the article information include ID information of the article and heating conditions.

In the foregoing configuration, when a shopper enters a store, the shopper selects articles and carries them to the cash register. If there is an article which needs to be heated, either an employee or the shopper loads the article in a heating chamber of the microwave oven. The microwave oven recognizes the article information attached to the surface of the article owing to the article information reader controlled by the microwave oven.

In the present invention, not only an employee of a store but also a shopper can set heating conditions inherent to the article in the microwave oven merely by loading the article in the microwave oven.

A cash register system according to the present invention comprises a cash register and a microwave oven. The cash register calculates payments by shoppers in a store and has the ability to communicate with a microwave oven over a line. The microwave oven has the above-mentioned ability. Further, the microwave oven is connected to the cash register through communication over a line and has the ability to transmit or receive information concerning an article.

The cash register uses the article information to calculate payment by the shopper. The microwave oven heats the article according to the heating conditions included in the article information. The shopper unloads the heated article and uses it.

Moreover, the present invention uses an information carrier (tag) that stores conditions for processing an article and information for distinguishing the article, and that when microwaves are irradiated, transmits the respective information according to the microwaves.

Moreover, according to the present invention, the cash register need not read the article information read by the microwave oven.

Further, it becomes unnecessary to train a new employee of a store so that the employee can manage complex setting of the microwave oven. This brings about such effects that losses of articles resulting from incorrect operation of the microwave oven can be eliminated and that smooth running of the store can be attained.

Furthermore, there can be many modifications. For example, the article information may includes only ID information to identify the article, either of the microwave oven or the cash register comprises a data base system from which heating conditions for heating an article can be retrieved, and the heating control means retrieves heating conditions from said data base. The article information reader may be provided at the cash register. Information regarding heating condition is sent from the cash register to the microwave oven.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 1:
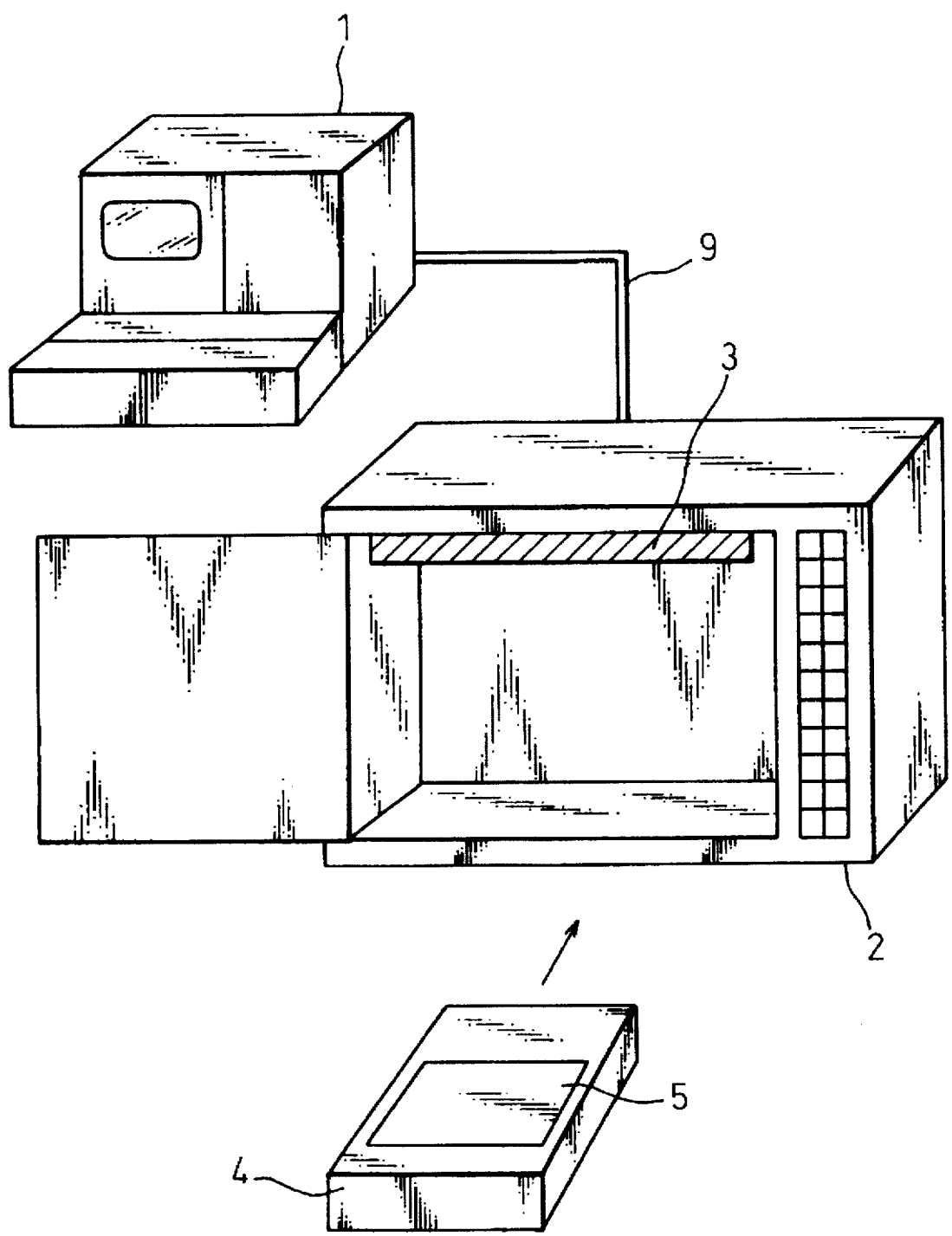
FIG. 1 is a diagram showing a constitution of a cash register system including a microwave oven of the first embodiment of the present invention.

FIG. 1 shows the constitution of the first embodiment relating to a cash register system of the present invention. In FIG. 1, reference numeral 1 denotes a cash register; 2 denotes a microwave oven; 3 denotes an article information reader; 4 denotes an article; 5 denotes an article information recording medium; and 9 denotes a communication line connecting the cash register 1 and the microwave oven 2.

In this embodiment, a POS terminal is used as the cash register 1. The POS terminal has the ability to calculate a payment by a shopper in a store, and includes means for communicating with the microwave oven 2 over the line 9.

The microwave oven 2 has the ability to heat the article 4 by irradiating microwaves onto the article 4. A magnetron is used for irradiating the article. The microwave oven 2 is connected to the cash register 1 through communication line 9.

An optical character recognition (OCR) unit is used as the article information reader 3 accompanying the microwave oven 2. The OCR unit 3 can read and recognize printed numerals and characters by scanning them. The article information recording medium 5 is printed matter attached to the surface of the article 4 and the information regarding the article is represented in a form of printed numerals and characters, namely, in the form of OCR characters.

Therefore, the OCR unit 3 can read required information concerning the article 4. The information recorded on the article information recording medium 5 includes an identification (ID) code of each article and information regarding heating conditions for the article such as the heating time. The ID code is reported from the microwave oven 2 to the POS terminal 1.

The article 4 is an article to be heated by the microwave oven 2, for example, a lunch or made dish encased in a heat-proof container made of plastic or the like. The article 4 is heated by the microwave oven 2.

The article information recorded on the article information recording medium 5 attached to an article 4 is read by the OCR 3. The ID code and the information regarding the heating condition are extracted from the article information. The extracted ID code of the article to be heated is sent to the POS terminal 1. The POS terminal 1 recognizes a price of the heated article based on the article information, and the total of the prices for the heated articles and the other articles is calculated by a cash register. Therefore, the POS terminal 1 does not need to read the ID codes of the heated articles.

The POS terminal 1 and microwave oven 2 are connected to each other over the line 9, whereby various kinds of information are transferred and desired control is given.

On the other hand, information regarding heating conditions read by the OCR is used in the microwave oven 2. The microwave oven heats the articles inserted according to the corresponding heating conditions.

Figure 2:
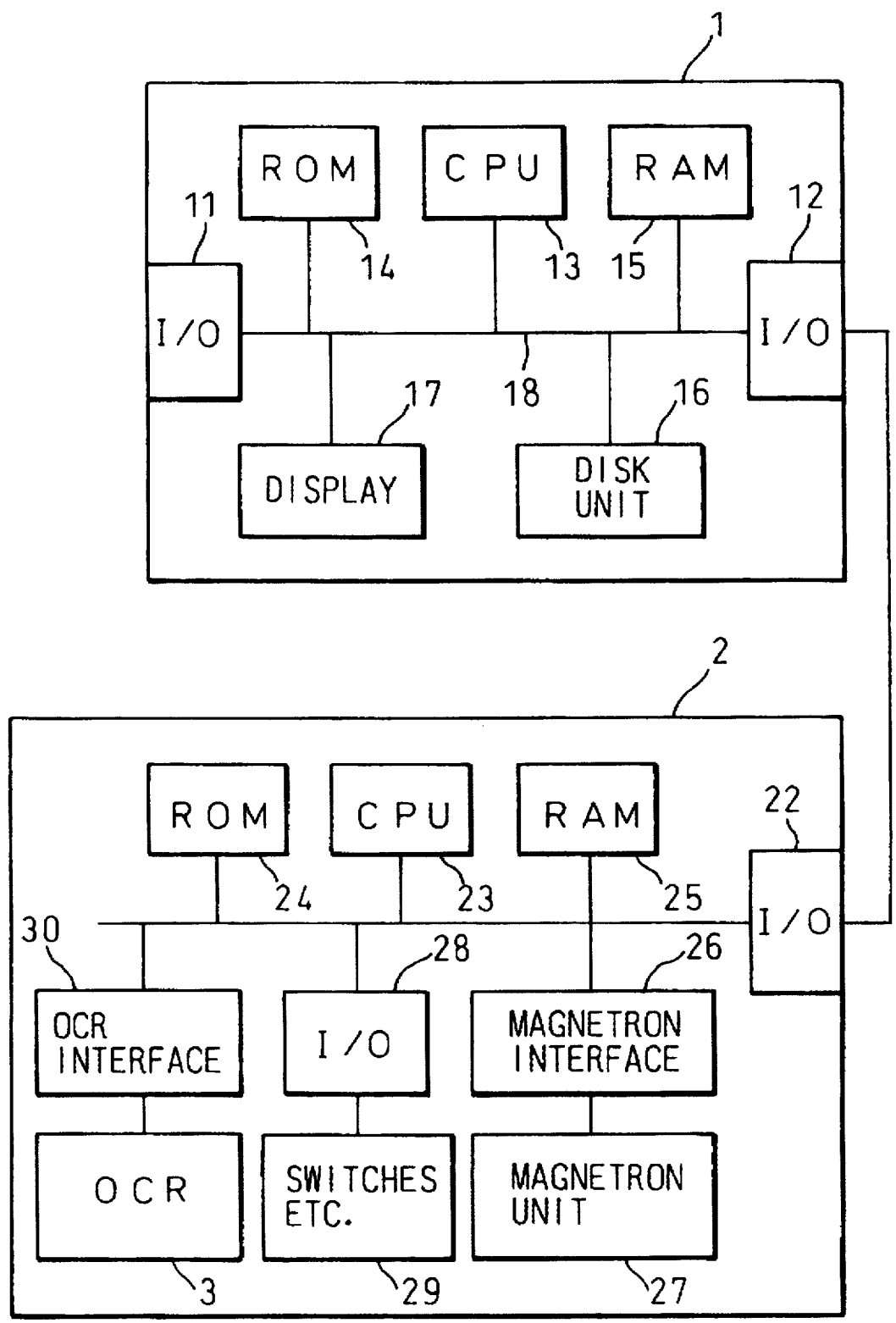
FIG. 2 is a schematic block diagram of the first embodiment.

FIG. 2 is a schematic block diagram showing an example of the typical constitution of the POS terminal 1 and microwave oven 2 of the present embodiment.

In addition to a facility serving as a normal register, the POS terminal 1 includes an interface (I/O) 11 for communicating with a host-computer that is not shown and an interface (I/O) 12 for communicating with a microwave oven 2.

The POS terminal 1 further comprises a CPU 13, ROM 14, RAM 15, a disk unit 16 for storing article codes in a one-to-one relation with article information such as article names and prices, and a display 17 for displaying payments. These elements are connected through a bus 18.

The microwave oven 2 includes an interface (I/O) 22 for communicating with a POS terminal 1, CPU 23, ROM 24, RAM 25, a magnetron interface 26, a magnetron 27, an I/O unit 28 which operates as an interface for other elements 29 such as switches, an OCR interface 30, and an OCR 3. The CPU 23, ROM 24, and RAM 25 constitute a control unit of the microwave oven 2.

Figure 3:
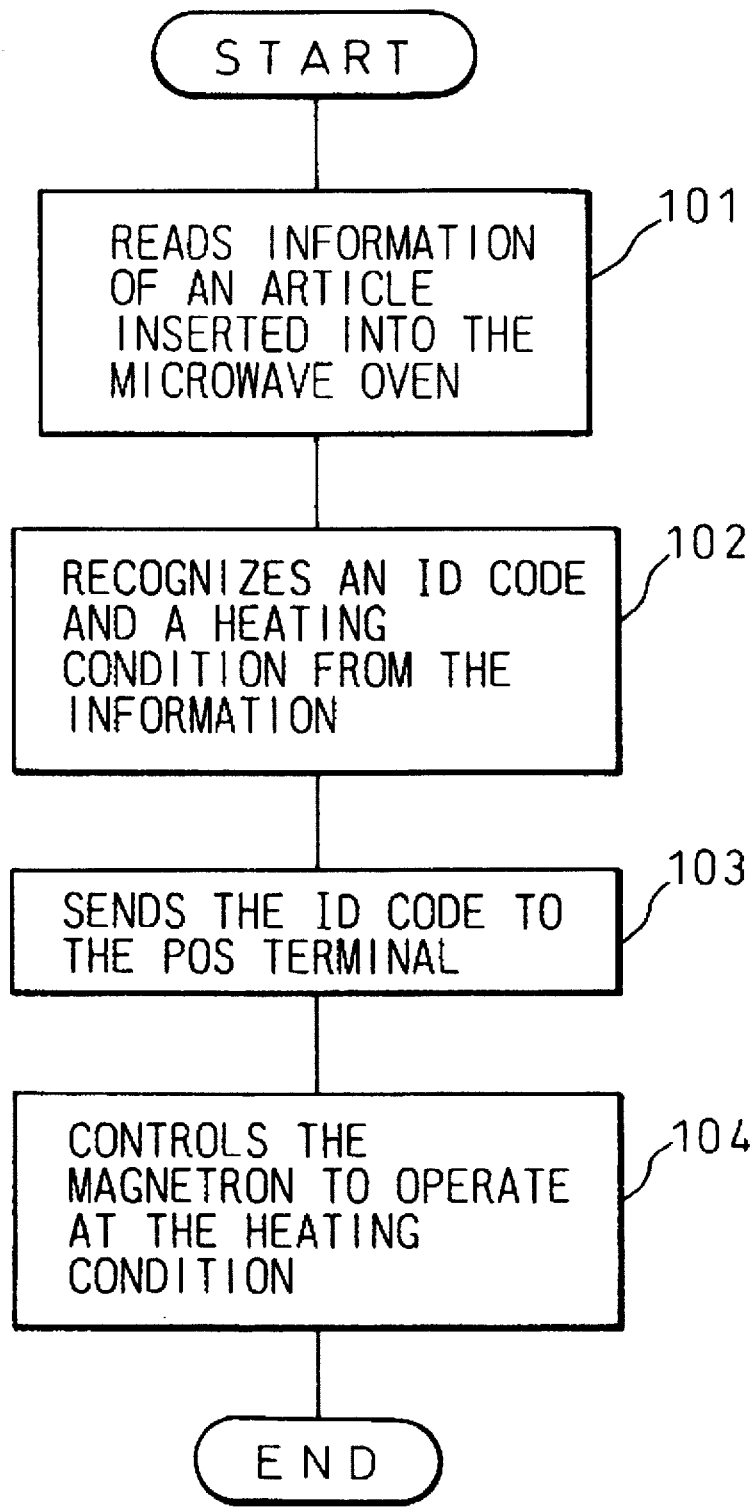
FIG. 3 is a flowchart showing control operations of the microwave oven of the first embodiment.

FIG. 3 is a flowchart showing a control operation of the microwave oven 2 in the first embodiment.

In this embodiment, a shopper enters a store, selects articles 4 to be purchased, and carries them to the POS terminal 1. When the selected articles include an article to be heated, either an employee of the store or the shopper himself/herself loads the article in the heating chamber of the microwave oven 2.

At step 101, the OCR 3 of the microwave oven 2 reads information recorded on the article information recording medium 5 attached to an article 4 inserted into the microwave oven 2.

At step 102, the control unit of the microwave oven 2 recognizes an ID code and heating conditions of the article from the information read by the OCR 3.

At step 103, the control unit of the microwave oven 2 sends the ID code to the POS terminal 1 via the I/O 22. The POS terminal 103 searches a price of the article to be heated and adds it to a payment of the shopper.

At step 104, the control unit of the microwave oven 2 controls the magnetron 27 to heat the article 4 according to the heating conditions included in the article information 5, for example, a heating time and a heating output level. The shopper unloads the heated article 4 and consumes it.

In the first embodiment, the article information recording medium 5 is printed matter attached to the surface of the article 4, the information regarding the article is represented in a form of printed numerals and characters, and the OCR unit 3 is used as the article information reader. However, the article information recording medium 5 may be a bar-code, and a bar-code reader can be used as the article information reader.

A known tag disclosed in U.S. Pat. No. 5,214,410 has a facility that can transmit or receive data carried by a radio wave owing to a built-in compact receiving circuit, and that when received data is addressed to the tag, transmits associated data. This tag can be used as the article information recording medium. A possible system constitution using these tags is such that: a tag functioning as such a supercompact transponder as the one mentioned above is attached as the article information recording medium relating to the present invention; and required article information is acquired by receiving a radio wave sent from the tag in response to an inquiry carried by an external radio wave.

In this case, the article information reader 3 is an antenna and receiver to communicate with the tag.

Figure 4:
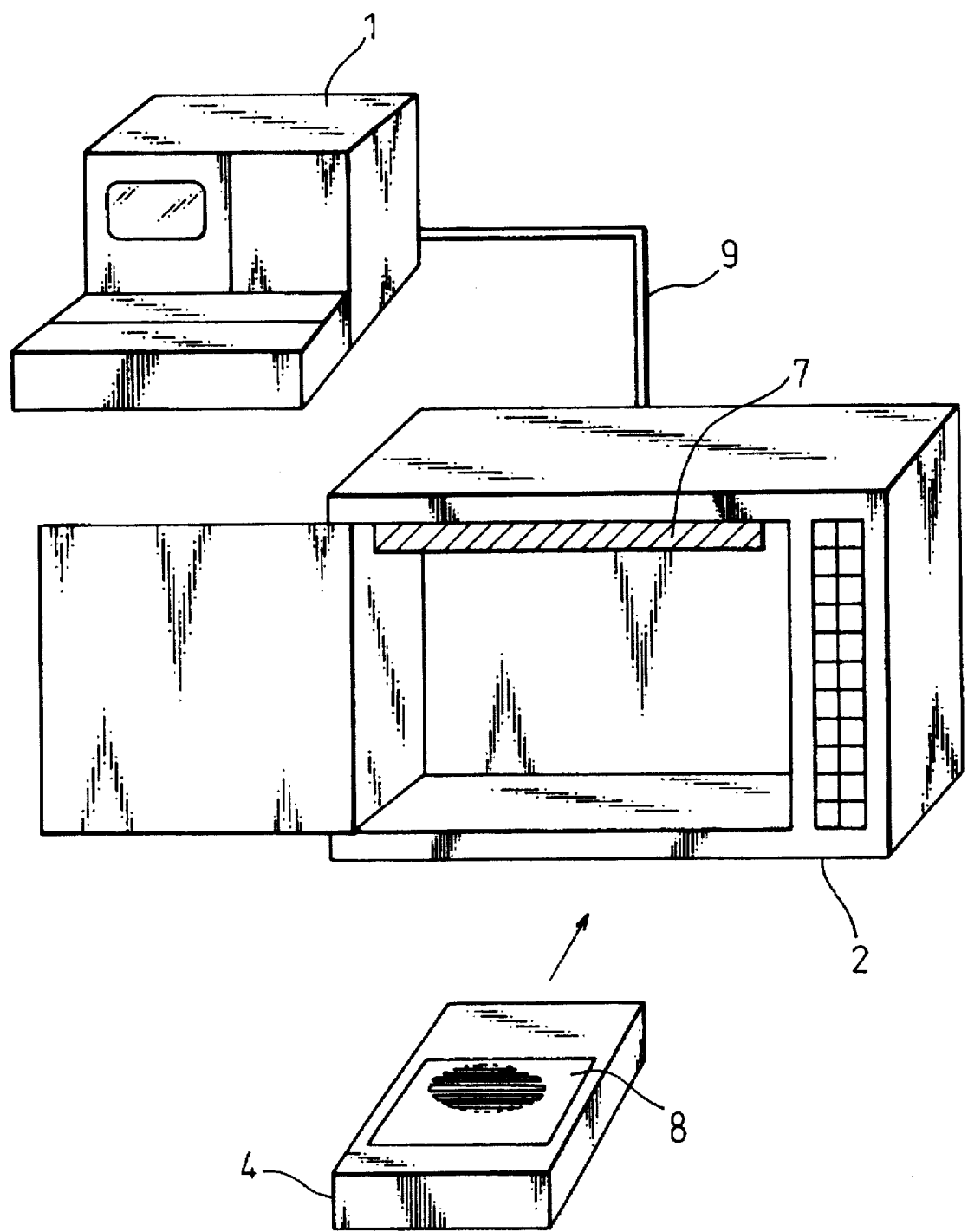
FIG. 4 is a diagram showing a constitution of a second embodiment of the present invention.

FIG. 4 is a diagram showing a constitution of the second embodiment in which the above-mentioned tag is used as the article information recording medium 8. In FIG. 4, component elements identical to those in FIG. 1 are assigned the same reference numerals.

In this modification, the microwave oven 2 includes a radio-wave article recognizing unit 7 serving as a means for implementing the capability of the article information reader 3.

The radio-wave article recognizing unit 7 has the ability to recognize a response signal sent when a beam irradiator in the microwave oven 2 transmits a beam to a radio-wave article information recording medium 8 attached to the article 4.

The radio-wave article information recording medium 8 is a tag having a function serving as a kind of transponder. The radio-wave article information record 8 has the ability to recognize a request signal carried by an output beam irradiated by the microwave oven 2 and transmits a response signal.

In the radio-wave article information recording medium 8, heating conditions such as a heating time are recorded together with an ID of an article.

In the foregoing constitution, after the article 4 is loaded in the heating chamber of the microwave oven 2 and a door is closed, when a start button is pressed, the microwave oven 2 transmits microwaves with a frequency of 2.5 GHz.

The microwaves are used to heat an article. In response to the microwaves with a frequency band of 2.5 GHz, the radio-wave article information record 8 transmits recorded information.

As mentioned above, the frequency band of microwaves used for heating and transmitted by a microwave oven agrees with the one of microwaves used by the radio-wave article information recording medium 8. This modification makes the most of this point.

With transmission of microwaves with a frequency band of 2.5 GHz from the microwave oven, the radio-wave article information 8 transmits an article ID that is article information and heating conditions as a response signal.

The radio-wave article recognizing unit 7 in the microwave oven 2 receives the response signal and reports the article ID to the POS terminal 1. According to the heating conditions set in the microwave oven 2, the microwave oven 2 heats the article 4.

Herein, a high-speed system can be provided.

Incidentally, an output level of an electromagnetic wave during heating is so high that the radio-wave article information recording medium 8 may be broken when the microwaves are used as they are.

Consequently, before information is read, the output level is minimized. After information including a heating time is acquired, the output level may be raised.

Figure 5:
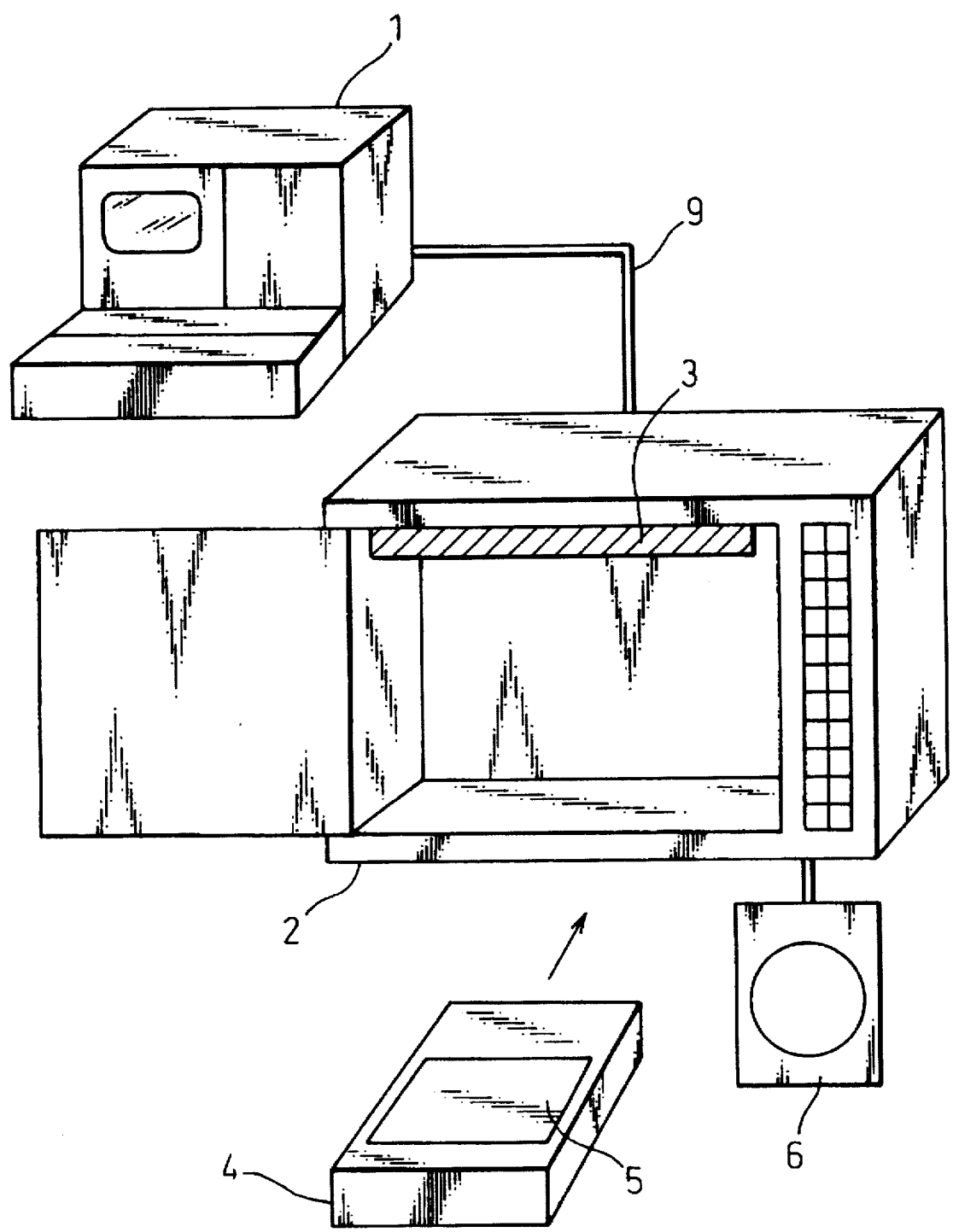
FIG. 5 is a diagram showing the constitution of a third embodiment.

FIG. 5 is a diagram showing a system constitution of the third embodiment of the present invention. In FIG. 5, component elements identical to those in FIG. 1 are assigned the same reference numerals.

In this embodiment, a data base system 6 is included. The data base 6 is connected to the microwave oven 2. The hardware of the data base system 6 is, for example, a hard disk.

In the data base 6, article information is stored in a one-to-one relation with ID information of articles.

Figure 6:
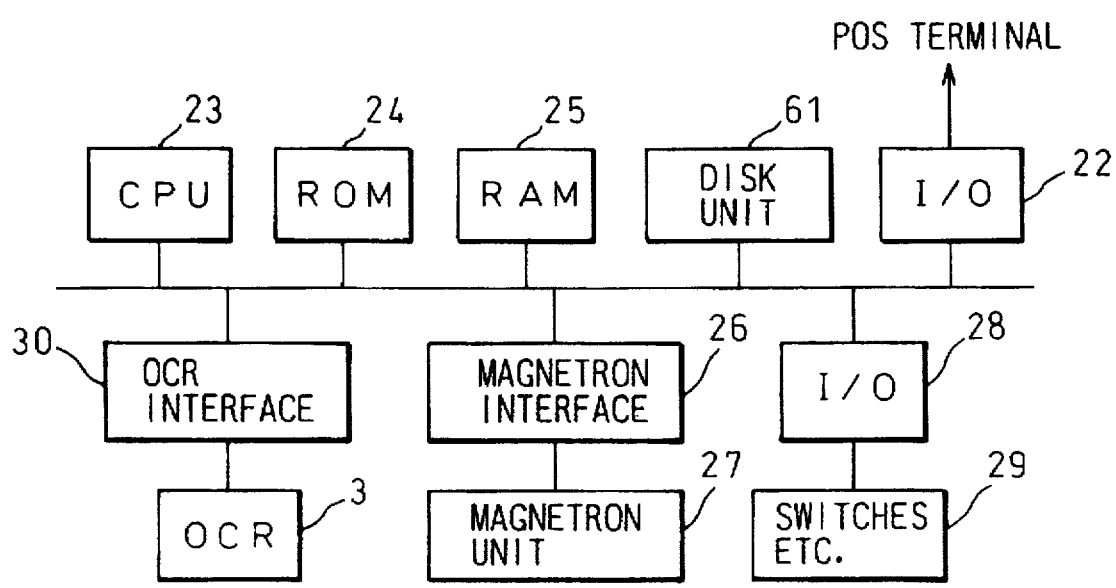
FIG. 6 is a schematic block diagram of a microwave oven of the third embodiment.

FIG. 6 is a schematic block diagram showing an example of the typical constitution of the microwave oven 2 of the present embodiment.

In addition to the constitution of the first embodiment, a disk unit 61 is added. The disk unit 61 stores information of the data base system 6. The article information recorded in the article information recording medium 5 does not include a heating condition of an article. The microwave oven 2 can retrieve article information of an article as well as heating information thereof from the data base 6 on the basis of the ID code of the article 4 read from the article information recording medium 5. When the article 4 is loaded in the heating chamber of the microwave oven 2, the article information recorded in the article information recording medium 5 is read by the article information reader 3 and it is recognized by the control unit of the microwave oven 2.

Article information such as an article name and price recognized by the microwave oven 2 is reported to the POS terminal 1. The microwave oven 2 retrieves heating conditions such as a heating time and heating output level concerning the article from the data base 6, and heats the article 4 according to the conditions.

Aside from the hard disk, a medium such as a RAM, ROM, floppy disk, CD-ROM, or the like can be used as the data base 6.

Figure 7:
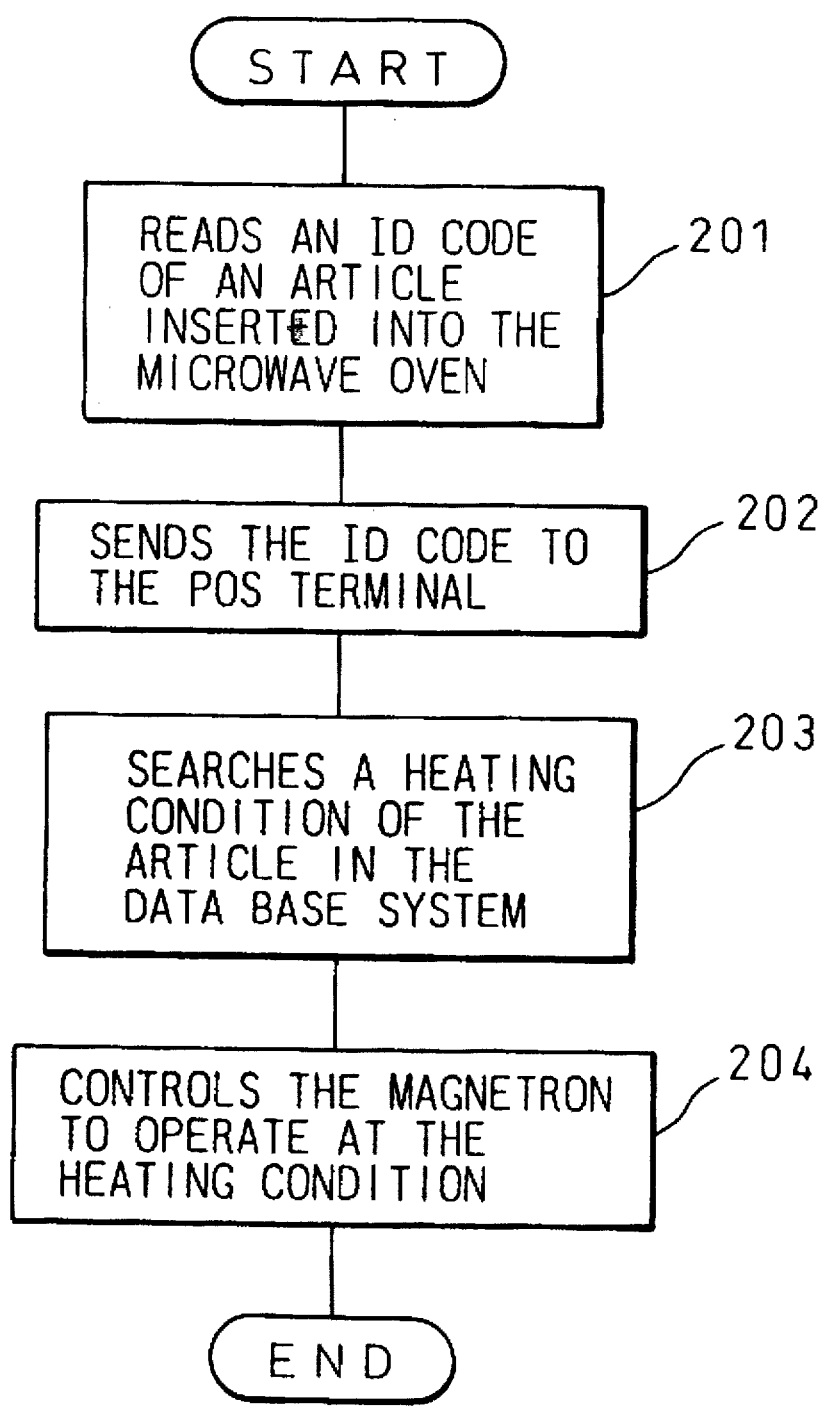
FIG. 7 is a flowchart showing control operations of the microwave oven of the third embodiment.

FIG. 7 is a flowchart showing a control operation of the microwave oven 2 in the third embodiment.

At step 201, the OCR 3 of the microwave oven 2 reads an ID code of the article 4 recorded in the article information recording medium 5 attached to an article 4.

At step 202, the control unit of the microwave oven 2 sends the ID code to the POS terminal 1 via the I/O 22. The POS terminal 1 searches for the price of the article to be heated and adds it to the payment by the shopper.

At step 203, the control unit of the microwave oven 2 searches for a heating condition of the article in the data base system 6.

At step 204, the control unit of the microwave oven 2 controls the magnetron 27 to heat the article 4 according to the heating conditions.

According to this embodiment, the microwave oven 2 manages the data base 6 and can therefore retrieve information at a high speed on the basis of the article information.

Figure 8:
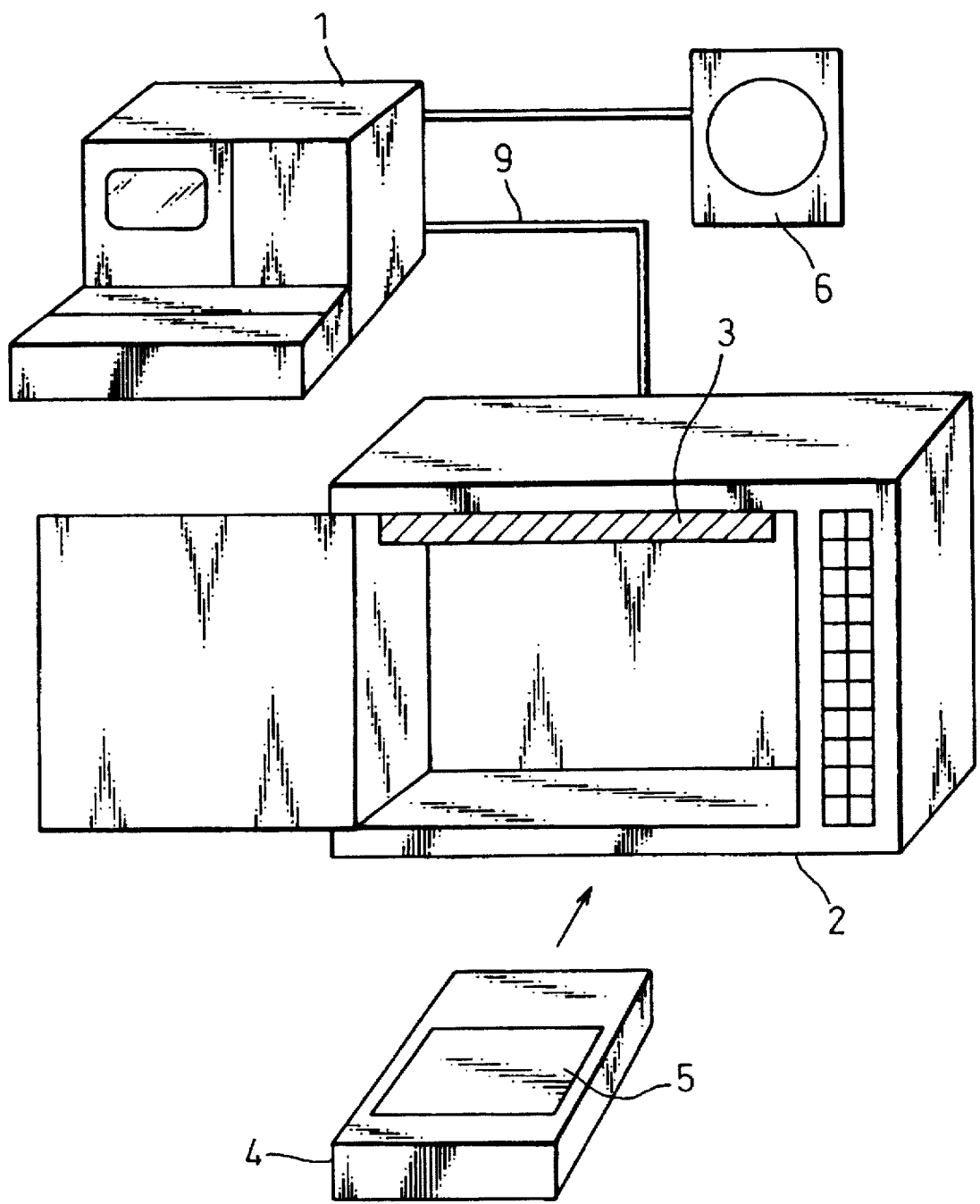
FIG. 8 is a diagram showing the constitution of a fourth embodiment.

FIG. 8 is a diagram showing a schematic constitution of the fourth embodiment of the present invention. In FIG. 8, component elements identical to those in FIG. 1 are assigned the same reference numerals.

In this embodiment, the data base 6 is connected to the POS terminal 1. The data base 6 is, similarly to that in the third embodiment, a hard disk.

On an article in this embodiment, ID information of the article is recorded in the form of a code. No other information is recorded. In the data base 6, ID codes are stored in a one-to-one relation with article information such as article names as well as heating times.

The POS terminal 1 can retrieve article information and heating information from the data base 6 on the basis of the information read from the article information recording medium 5. The information is read by the article information reader 3 located in the microwave oven 2.

Figure 9:
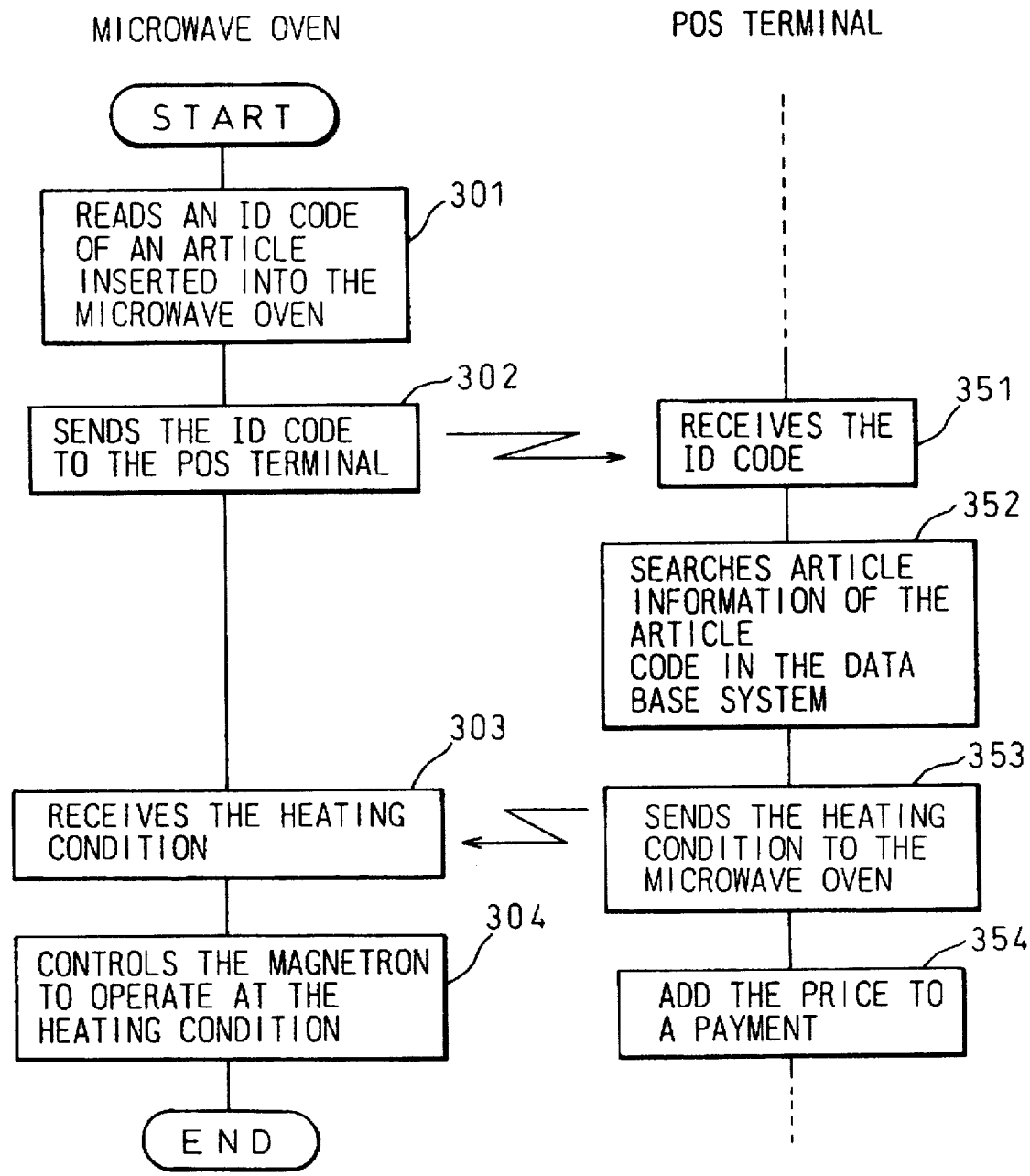
FIG. 9 is a flowchart showing control operations of the fourth embodiment.

FIG. 9 is a flowchart showing a control operation of the microwave oven 2 in the fourth embodiment.

The article 4 to be heated is loaded in the microwave oven 2.

At step 301, the article information reader 3 recognizes the ID information of the article 4 to be heated. At step 302, the ID information is reported to the POS terminal 1. At step 351, the POS terminal 1 receives ID information. At step 352, the POS terminal 1 retrieves article information such as an article name as well as heating conditions from the data base 6. At step 353, the POS terminal 1 sends the heating conditions to the microwave oven 2.

At step 352, the POS terminal 1 searches for the price of the article in the data base system 6 as well as ID and heating information. At step 354, the POS terminal 1 adds the price to the payment by the shopper.

At step 303, the microwave oven 2 receives the heating condition sent from the POS terminal 1. At step 304, the control unit of the microwave oven 2 controls the magnetron to operate in the heating condition.

According to this embodiment, the POS terminal 1 manages the data base 6 and can therefore retrieve the article information concerning diverse kinds and large numbers of articles 4.

Figure 10:
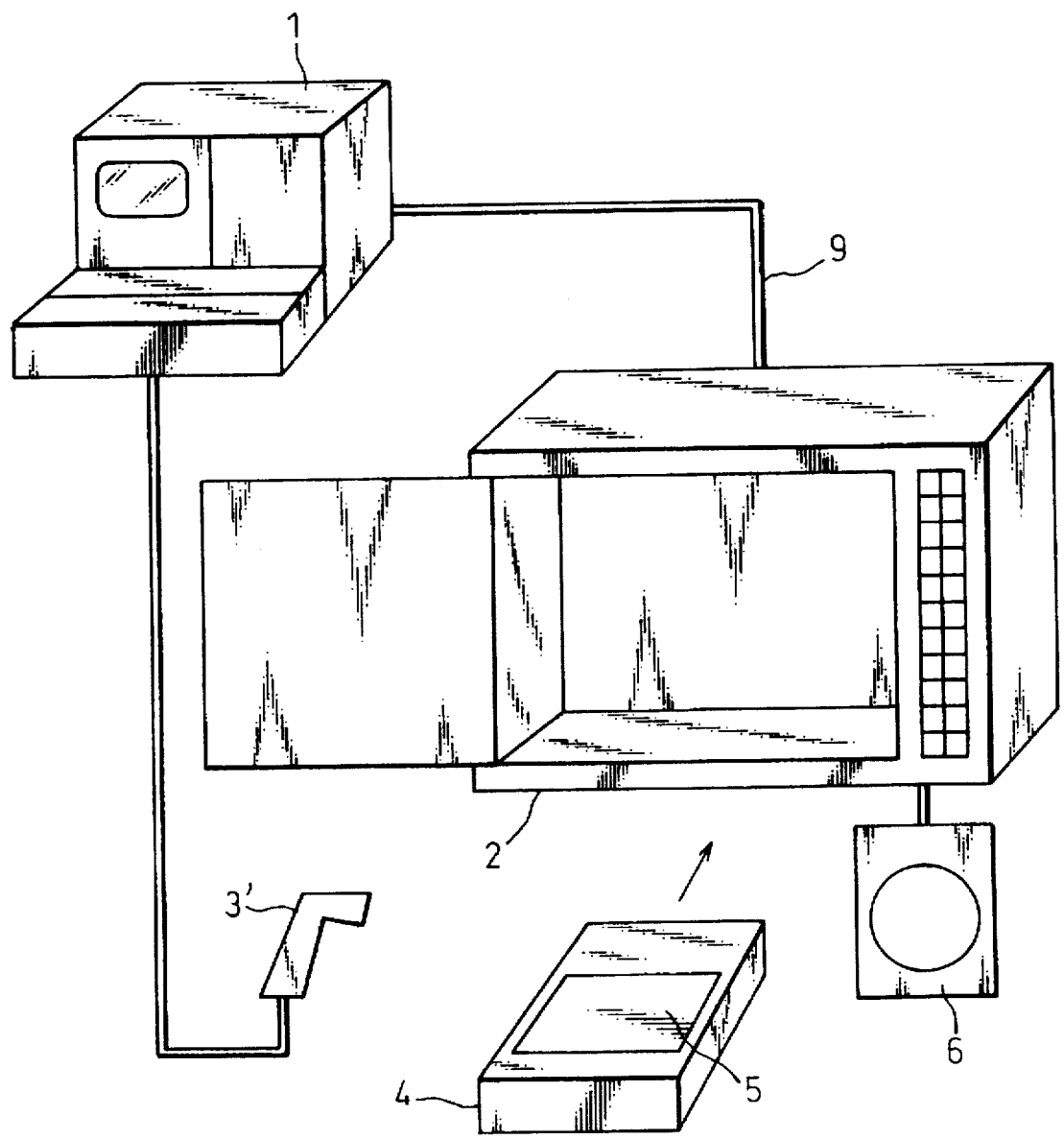
FIG. 10 is a diagram showing the constitution of a fifth embodiment.

FIG. 10 is a diagram showing a constitution of the fifth embodiment of the present invention. In the drawing, component elements identical to those in FIG. 1 are assigned the same reference numerals.

In this embodiment, the microwave oven 2 does not have an article information reader. The POS terminal 1 manages and controls, for example, a handy article information reader 3'. The POS terminal 1 recognizes the article information owing to the article information reader 3'.

The article information 5 attached to the article 4 is read by the article information reader 3' managed and controlled by the POS terminal 1, used for calculation of a payment, and reported to the microwave oven 2 over the line 9.

The microwave oven 2 retrieves heating conditions from the data base 6 connected to the microwave oven 2, and can therefore heat the article 4 according to the heating conditions.

According to the heating conditions retrieved on the basis of the article information read by the article information reader 3' connected to the POS terminal 1, the microwave oven 2 is controlled so that the article 4 can be heated according to given conditions retrieved from the data base 6.

Figure 11:
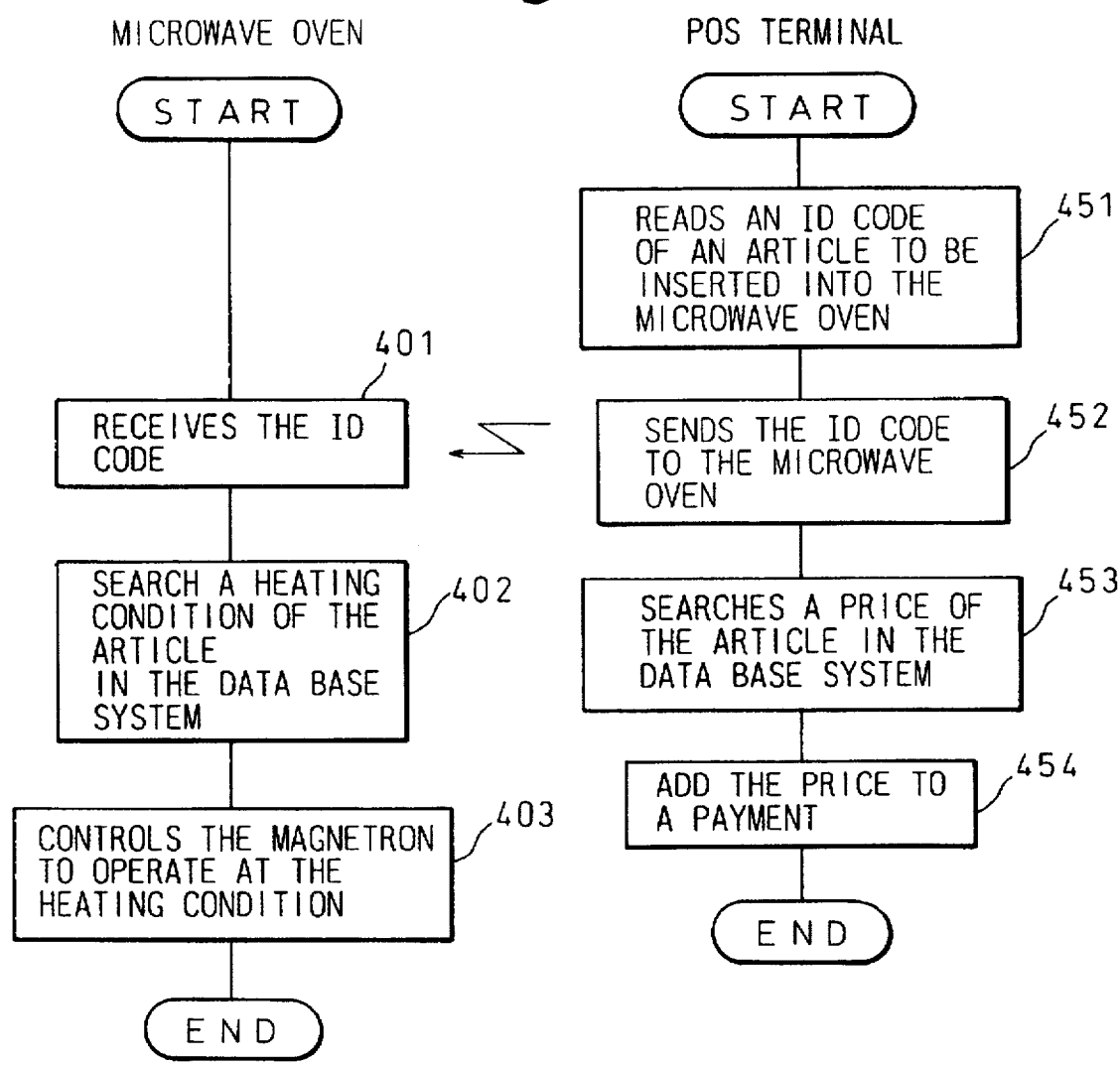
FIG. 11 is a flowchart showing control operations of the fifth embodiment.

FIG. 11 is a flowchart showing a control operation of the microwave oven 2 in the fifth embodiment.

At step 451, the article information reader 3' recognizes ID information of the article 4 to be heated before the article 4 is loaded in the microwave oven 2. At step 452, the ID information is reported to the microwave oven 2. At step 453, the POS terminal 1 searches for the price of the article in the data base system 6. At step 454, the POS terminal 1 adds the price to the payment by the shopper.

At step 401, the microwave oven 2 receives ID information. At step 402, the control unit of the microwave oven 2 retrieves article information such as heating conditions from the data base 6. At step 403, the control unit of the microwave oven 2 controls the magnetron to operate in the heating condition.

According to this embodiment having the foregoing constitution, the POS terminal 1 can calculate payment at a high speed.

Figure 12:
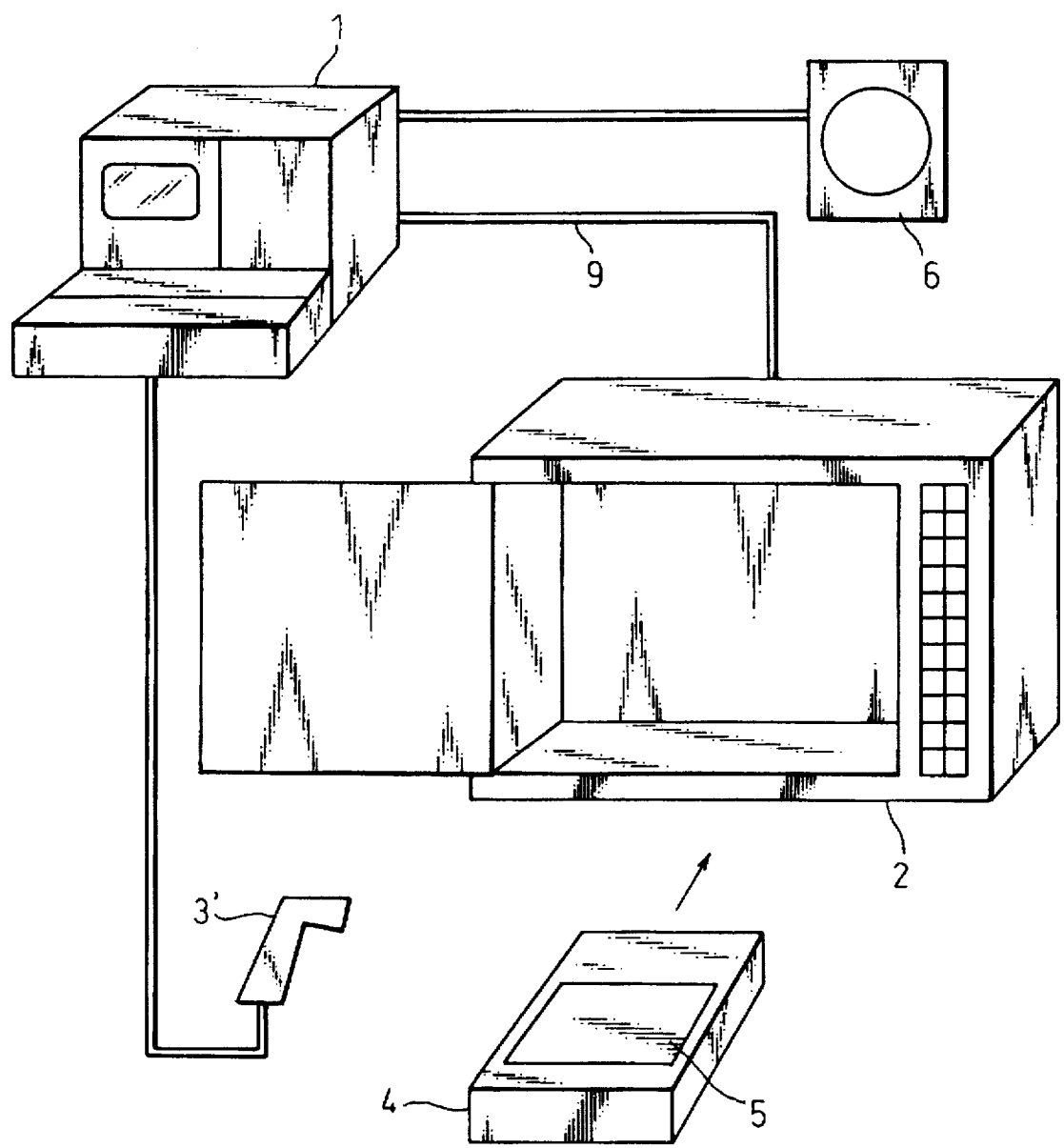
FIG. 12 is a diagram showing the constitution of a sixth embodiment.

FIG. 12 is a diagram showing the constitution of the sixth embodiment of the present invention. In the drawing, component elements identical to those in FIG. 1 are assigned the same reference numerals.

In this embodiment, the article information reader 3 and data base 6 are not connected to the microwave oven 2.

The hand-held article information reader 3' is, similar to the one in the fifth embodiment, managed and controlled by the POS terminal 1. Owing to the article information reader 3', the article information is recognized by the POS terminal 1.

The data base 6 may be, for example, a hard disk. Based on the article information 5 read by the article information reader 3' connected to the POS terminal 1, heating information can be retrieved.

The article information of the article 4 is therefore read by the article information reader 3' managed by the POS terminal 1 and used for calculation of a payment.

The article information is used for calculation of payment and also used to retrieve heating conditions from the data base 6. The heating conditions are reported to the microwave oven 2. The microwave oven 2 can heat the article 4 according to the reported heating conditions.

Figure 13:
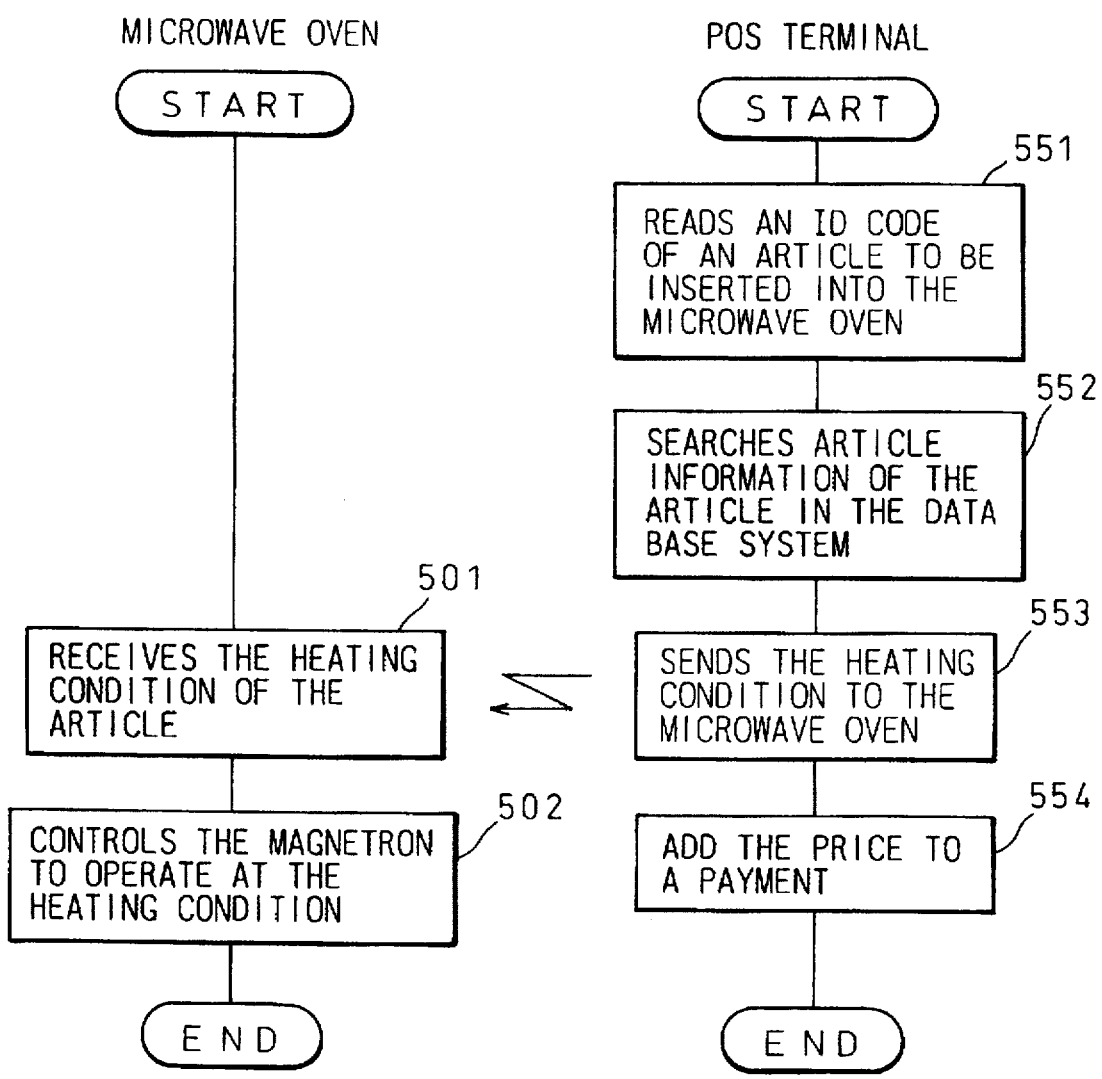
FIG. 13 is a flowchart showing control operations of the sixth embodiment.

FIG. 13 is a flowchart showing a control operation of the microwave oven 2 in the sixth embodiment. At step 551, the article information reader 3' recognizes ID information of the article 4 to be heated before the article 4 is loaded in the microwave oven 2. At step 552, the POS terminal 1 retrieves article information such as a price of the article and the heating conditions from the data base 6. At step 553, the heating condition is reported to the microwave oven 2. At step 554, the POS terminal 1 adds the price, which was found at step 552, to the payment by the shopper.

At step 501, the microwave oven 2 receives the heating conditions for the article. At step 502, the control unit of the microwave oven 2 controls the magnetron to operate in the heating condition.

According to this embodiment having the foregoing configuration, the large-capacity data base 6 can be connected. Consequently, a system enabling high-speed retrieval of information concerning any diverse article 4 can be provided.

Figure 14:
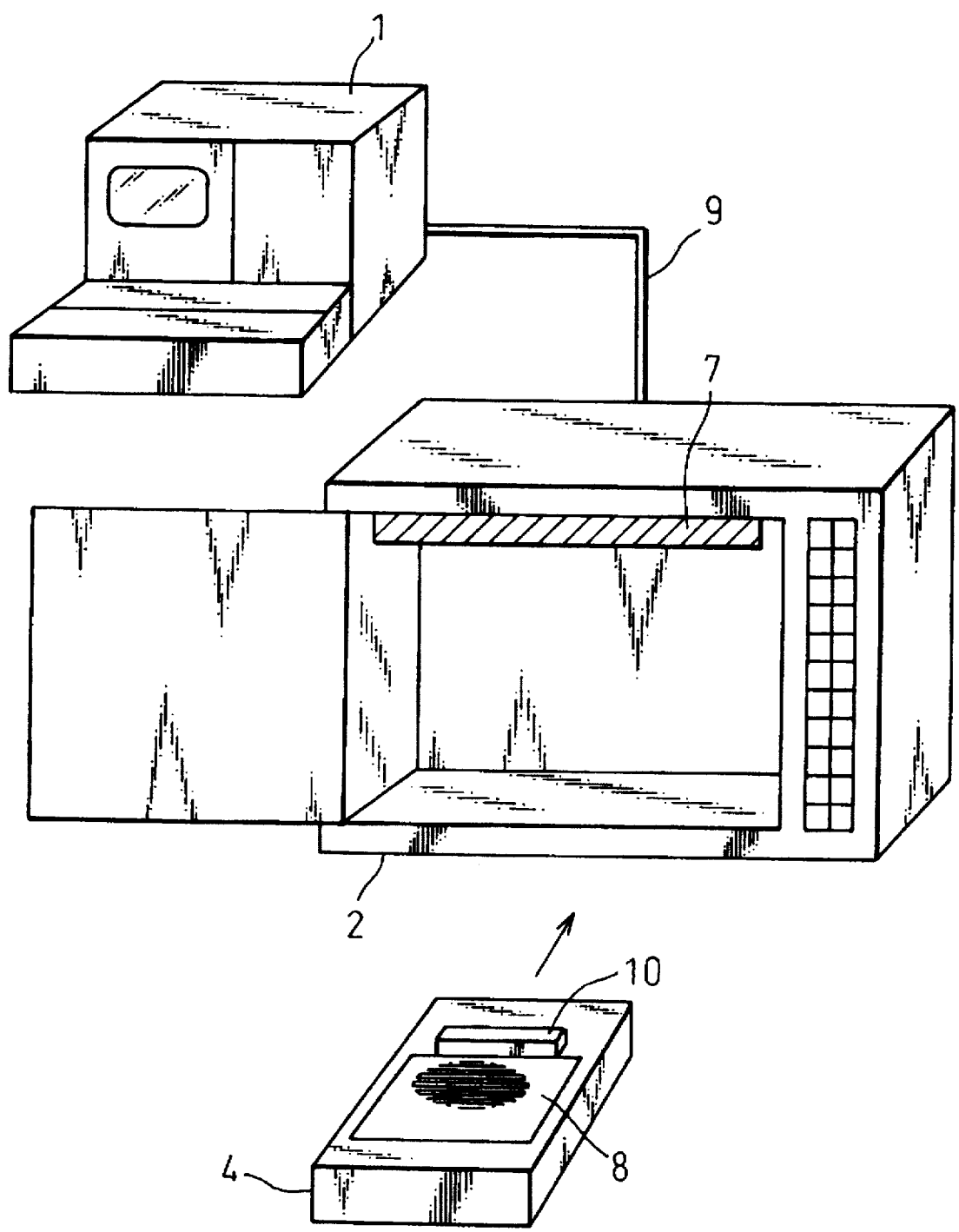
FIG. 14 is a diagram showing the constitution of a seventh embodiment.
Figure 2:
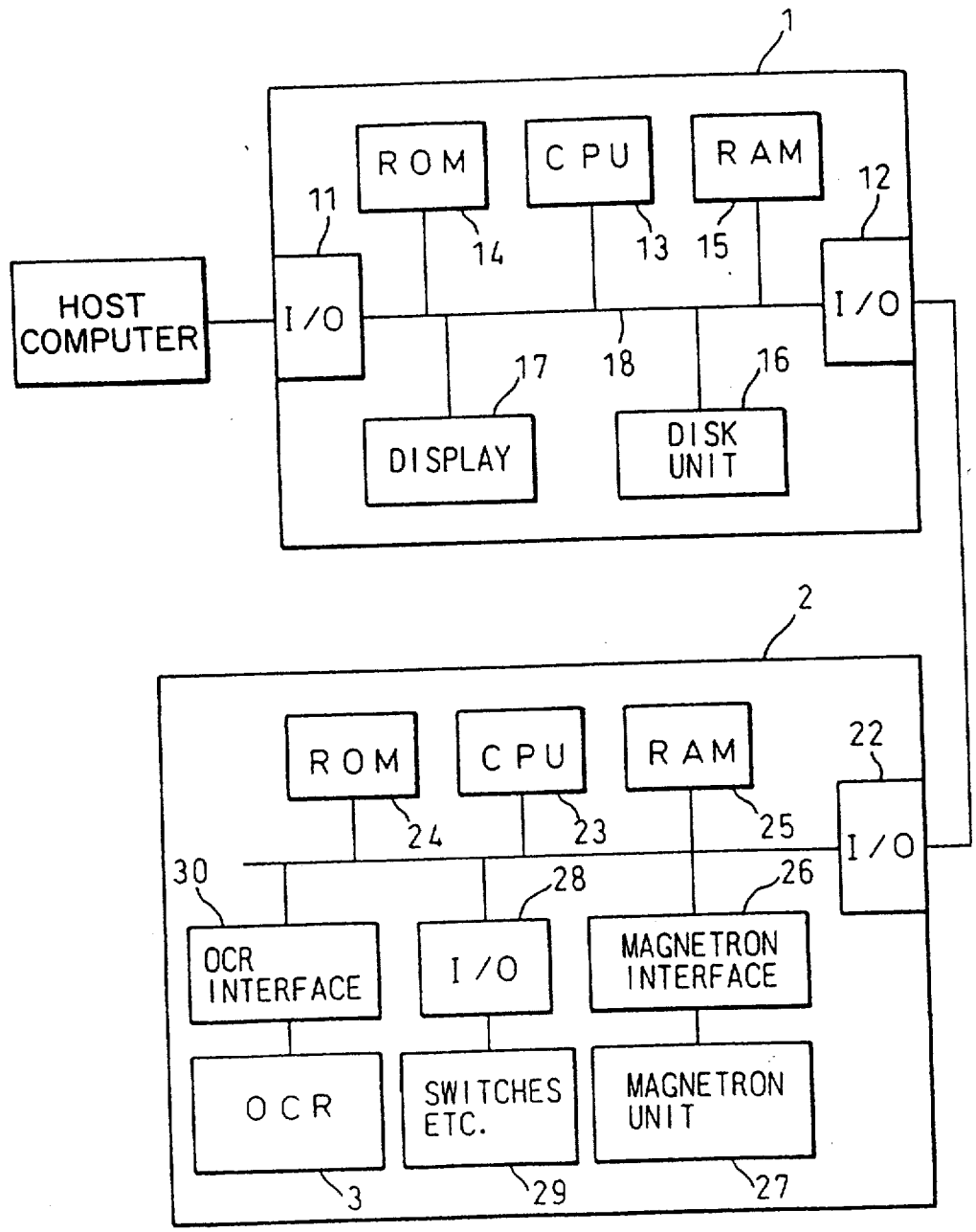

FIG. 14 is a diagram showing a constitution of the seventh embodiment of the present invention. In the drawing, component elements identical to those in FIG. 1 are assigned the same reference numerals.

Shown herein is the configuration in which the radio-wave article information 8 attached to an article to be loaded in the microwave oven 2 generates a response signal and functions as a heat source for an article.

An element 10 which can convert electromagnetic energy into thermal energy and accumulate the thermal energy or which can accumulate electromagnetic energy in the form of charge and convert the charge into thermal energy is provided on an article 4 as a heat source.

For example, the heat source has the ability to accumulate charge in a capacitor, and has the ability to keep an article warm by continually transmitting a weak response according to a charge corresponding to a beam sent from the microwave oven 2 after heating is completed and irradiation is completed.

After heating is completed, even if it takes time to carry a heated article to a destination in, for example, the coldest season in the winter, the article can be kept warm. Thus, a facility for keeping a warm state can be provided.

As described so far, according to the present invention, not only the procedure according to which an employee of a store operates a microwave oven can be simplified but also management of articles can be accomplished perfectly. Moreover, the selling situation of articles in a store can be recognized. Since the time required to attend a shopper is shortened, services given at a store can be improved.

Moreover, according to the present invention, not only can waste of articles, or a hazard stemming from incorrect setting of heating conditions by an inexperienced employee or user, be eliminated but also finer heating conditions can be set optimally for each article. Thus, a great contribution to the running or management of a store is expected.

What is claimed is:

1. A microwave oven comprising:
    an irradiator for irradiating microwaves to heat articles;
    an article information reader for reading article information from an article information recording medium disposed on the surface of the article; and
    heating control means for controlling the irradiator to operate at a condition determined based on the article information read by the article information reader,
    wherein the article information recording medium is a radio-wave article information means which generates a response signal in response to an external radio signal, the article information reader includes a radio-wave transmitter for transmitting the external radio signal, a radio-wave receiver for receiving the response signals from the radio-wave article information means, and a decoder for decoding the response signal.

2. A microwave oven according to claim 1, wherein the article information recording medium is printed matter on which numerals and characters are printed, and the article information reader is an optical character recognition unit.

3. A microwave oven according to claim 1, wherein the article information recording medium is printed matter on which bar codes are printed, and the article information reader is a bar code reader.

4. A microwave oven according to claim 1, wherein the radio-wave article information means is a transponder which generates a response signal in response to the external radio signal.

5. A microwave oven according to claim 1, wherein the irradiator is used as the radio-wave transmitter.

6. A microwave oven according to claim 1, wherein the article information is ID information to identify the article, the microwave oven comprises a data base system from which heating conditions for heating an article can be retrieved, and the heating control means retrieves heating conditions from said data base based on the ID information read by the article information reader.

7. A cash register system of a store comprising:
    a cash register; and
    a microwave oven including an irradiator for irradiating electromagnetic waves to heat articles; an article information reader for reading article information from an article information recording medium arranged on the surface of the article; and a heating control means for controlling the irradiator to operate at a condition determined based on the article information read by the article information reader, the microwave oven being connected to the cash register to be able to send information to the cash register,
    wherein the microwave oven sends the article information read by the article information reader to the cash register, and the cash register executes a payment calculation operation regarding the article to be heated on the basis of the article information sent from the microwave oven.

8. A cash register system according to claim 7, wherein the cash register is a POS terminal connected to a host computer.

9. A cash register system according to claim 7, wherein the article information recording medium is a printed matter on which numerals and characters are printed, and the article information reader is an optical character recognition unit.

10. A cash register system according to claim 7, wherein the article information recording medium is printed matter on which bar codes are printed, and the article information reader is a bar code reader.

11. A cash register system according to claim 7, wherein the article information is ID information to identify the article, the microwave oven comprises a data base system from which heating conditions for heating an article can be retrieved, and the heating control means retrieves heating conditions from said data base based on the ID information read by the article information reader.

12. A cash register system according to claim 7, wherein the article information is ID information to identify the article, the cash register comprises a data base system from which heating conditions for heating an article can be retrieved, the microwave oven sends the ID information to the cash register, the cash register retrieves the heating conditions from the data base system based on the ID information and sends the heating conditions to the microwave oven, and the heating control means controls the irradiator based on the heating conditions.

13. A cash register system according to claim 7, wherein the article information recording medium is a radio-wave article information means which generates a response signal in response to an external radio signal, the article information reader includes a radio-wave transmitter for transmitting the external radio signal, a radio-wave receiver for receiving the response signal from the radio-wave article information means, and a decoder for decoding the response signal.

14. A cash register system according to claim 13, wherein the radio-wave article information means is a transponder which generates a response signal in response to the external radio signal.

15. A cash register system according to claim 13, wherein the irradiator is used as the radio-wave transmitter.

16. A cash register system for a store comprising:

a cash register including an article information reader for reading article information from an article information recording medium arranged on the surface of the article; and a microwave oven including an irradiator for irradiating electromagnetic waves to heat articles; and a heating control means for controlling the irradiator, the microwave oven being connected to the cash register to be able to receive information from the cash register, wherein the cash register sends the article information read by the article information reader to the microwave oven, and the heating control means controls the irradiator to operate at a condition determined based on the article information sent from the cash register.

17. A cash register system according to claim 16, wherein the cash register is a POS terminal connected to a host computer.

18. A cash register system according to claim 16, wherein the article information recording medium is printed matter on which numerals and characters are printed, and the article information reader is an optical character recognition unit.

19. A cash register system according to claim 16, wherein the article information recording medium is printed matter on which bar codes are printed, and the article information reader is a bar code reader.

20. A cash register system according to claim 16, wherein the article information is ID information to identify the article, the cash register sends the ID information read by the article information reader to the microwave oven, the microwave oven comprises a data base system from which heating conditions for heating an article can be retrieved, and the heating control means retrieves heating conditions from said data base.

21. A cash register system according to claim 16, wherein the article information is ID information to identify the article, the cash register comprises a data base system from which heating conditions for heating an article can be retrieved, the cash register retrieves the heating conditions from the data base system based on the ID information read by the article information reader and sends the heating conditions to the microwave oven, and the heating control means controls the irradiator based on the heating conditions.

22. A combination of a microwave oven and a cash register system, the combination comprising:

a microwave oven including an article information reader to read article information from an article information recording medium disposed on a surface of an article, and a heating control unit to operate at a condition determined based on the article information; and a cash register including a unit to receive the article information from the microwave and for calculating price information based on the article information.

* * * * *

UNITED STATES PATENT AND TRADEMARK OFFICE
CERTIFICATE OF CORRECTION

Page 1 of 2

PATENT NO. : 5,724,244
DATED : Mar. 8, 1998
INVENTOR(S) : YABUKI

It is certified that error appears in the above-identified patent and that said Letters Patent is hereby corrected as shown below:

Replace Sheet 2 of 14 (FIG.2 ) of the drawings with the attached FIG. 2.

Signed and Sealed this

Sixteenth Day of June, 1998

Attest:

BRUCE LEHMAN

*Attesting Officer*  Commissioner of Patents and Trademarks